United States Patent [19]

Ohtsu et al.

[11] Patent Number: 5,252,187

[45] Date of Patent: Oct. 12, 1993

[54] METHOD OF RECOVERING SOLVENT FROM MOTHER LIQUOR CONTAINING NON-VOLATILE MATTERS BY HEAT PUMP SYSTEM

[75] Inventors: Jun Ohtsu, Tokyo; Kanji Abe; Toshifumi Ida, both of Chiba, all of Japan

[73] Assignee: Toyo Engineering Corporation, Tokyo, Japan

[21] Appl. No.: 918,453

[22] Filed: Jul. 22, 1992

[30] Foreign Application Priority Data

Jul. 25, 1991 [JP] Japan ................................. 3-186207
Sep. 11, 1991 [JP] Japan ................................. 3-231714

[51] Int. Cl.$^5$ ........................... B01D 1/28; B01D 3/00
[52] U.S. Cl. ..................................... 203/26; 159/24.2; 159/DIG. 10; 159/47.1; 203/27; 203/78; 203/84; 203/DIG. 4; 203/DIG. 8; 203/DIG. 9
[58] Field of Search ............... 203/26, 14, 27, DIG. 8, 203/DIG. 9, 89, 78, 84, 72, 78, DIG. 4; 159/49, 5, 13.1, 24.2, DIG. 32, DIG. 10, 47.1; 260/DIG. 22

[56] References Cited

U.S. PATENT DOCUMENTS

| | | | |
|---|---|---|---|
| 4,177,111 | 12/1979 | Pieper et al. | 203/26 |
| 4,539,076 | 9/1985 | Swain | 203/26 |
| 4,559,108 | 12/1985 | Ahlberg | 203/26 |
| 4,566,947 | 1/1986 | Tsuruta | 203/DIG. 4 |
| 4,615,769 | 10/1986 | Horigome et al. | 203/26 |
| 5,124,004 | 6/1992 | Grethlein et al. | 203/DIG. 4 |

FOREIGN PATENT DOCUMENTS 0209602 12/1982 Japan.

*Primary Examiner*—Virginia Manoharan
*Attorney, Agent, or Firm*—Flynn, Thiel, Boutell & Tanis

[57] ABSTRACT

A method of recovering a solvent from a mother liquor in a system in which the mother liquor also contains non-volatile matter, volatile solute and volatile solvent, and the solute concentration is low, in which a heat pump distilling column (first column) is so operated as to work only as a concentrating section of a distilling column by feeding a mother liquor to the column bottom of the heat pump distilling column, contact of non-volatile matter with the concentrating section is prevented and the column bottom liquor is sent to an evaporator so as to separate the non-volatile matter by the evaporator, thereafter, a vapor from the evaporator is fed to a distilling column (second column), and distillates of first and second columns and bottoms of the second column are withdrawn as the products. The procedures described above are carried out under specific operation conditions.

2 Claims, 3 Drawing Sheets

METHOD OF RECOVERING SOLVENT FROM MOTHER LIQUOR CONTAINING NON-VOLATILE MATTERS BY HEAT PUMP SYSTEM

BACKGROUND OF THE INVENTION

1. Field of the Invention

The present invention relates to a method of recovering a solvent by a heat pump system. More particularly, it relates to a method of recovering a solvent which method will be useful in industrial fields requiring the recovery and re-utilization of volatile solutes and volatile solvents present in a mother liquor, in a system in which non-volatile solids or liquids also are dissolved in the mother liquor.

2. Description of the Related Prior Art

In the fields of industrial chemistry, petrochemistry, pharmaceuticals, foodstuffs, etc., volatile solutes and volatile solvents in a mother liquor have been recovered and re-utilized, in many cases from a system in which non-volatile solids or liquids also are dissolved in the mother liquor. Various methods of recovering the solvents have been proposed in the past as described below.

(1) Vapor re-compression system distillation method:

This system is referred to as a "heat pump distillation system" and has already been put into practical use in the fields of petrochemistry and foodstuffs as an energy-saving, economical distillation method for reducing the heat input required for effecting distillation (e.g., Japanese Patent Laid-Open No. 209602/1982).

(2) Evaporation technique:

This technique has been put into practical use as a technique for vaporizing and separating a solvent when non-volatile solids or liquids are dissolved in a volatile liquid. A large number of evaporators have been proposed.

(3) Multiple effect evaporation technique:

When the concentration of the solutes is low and large quantities of heat input are necessary in order to vaporize and separate the solvent, this technique sequentially connects a plurality of evaporators and sequentially causes evaporation in the evaporators by the use of the vapor generated by the evaporators of the preceding stages. This technique has already gained a wide application as a technique for reducing the heat input required in industrial fields.

(4) Continuous rectification technique not having recovery section:

This technique is referred to as a "still head" which has a rectifier having a fractionating column at a still section, and has conventionally been used as a batchwise or continuous rectification technique.

Among them, the vapor re-compression system distillation method and the multiple effect evaporation technique have been used primarily, in view of the energy savings they provide.

However, when applied to the solvent recovery method which is the object of the present invention, the conventional vapor re-compression system distillation method and the multiple effect evaporation technique are not free from the following problems. According to the conventional vapor re-compression system (heat pump system) distillation method, the concentrating (rectifying) section and the recovery (stripping) section of the distilling column are necessary in order to recover the column top fraction and the column bottom fraction, respectively. Hence, the mother liquor (feed material) must be fed to an intermediate location between the concentrating section and the recovery section. When the mother liquor contains a non-volatile solid and liquid, therefore, the non-volatile solid and liquid must flow down through the packing materials and trays of the recovery section, and this results in contamination and clogging of the column and eventual failure of the operation.

The multiple effect evaporation technique can process the mother liquor containing the non-volatile solids and liquids and can reduce the necessary heat input, but it cannot withdraw products having a specified, high purity. The combination technique with the "still head" can be employed to withdraw distillate products having a high purity, but a large number of evaporators equipped with the "still head" are necessary in order to withdraw distillate and bottom products having high purities, while reducing the heat input. In other words, in order to reduce the necessary heat input, the multiple effect evaporation technique needs a large number of effect columns and presents the problem that the cost of the installation is increased.

SUMMARY OF THE INVENTION

The present invention provides a solvent recovery method by a heat pump system, which method can withdraw distillate products and bottom products having high purities while reducing the necessary heat input and can use a simple apparatus.

The present invention relates to a method of recovering solutes and a solvent by a heat pump system from a working system which contains a volatile solute, a solvent and a non-volatile solute and, moreover, in which the solutes are present in low concentrations. The method comprises the steps of feeding a mother liquor to the column bottom of a heat pump distilling column (first column) so as to permit the heat pump distilling column to operate only as a concentrating section of a distilling column, thereby preventing the non-volatile matters from coming into contact with the concentrating section, sending the column bottom liquid of the first column to an evaporator, separating the non-volatile matters by means of the evaporator, feeding the vapor from the evaporator to a conventional distilling column (second column), and withdrawing distillates from the first and second columns and bottoms from the second column as the products, the method being characterized by the features that the steps described above are carried out under operation conditions satisfying the following relations:

1. The compression ratio (absolute pressure ratio) of the compressor for the column top vapor of first column: $Pd/Ps \leq 10$ (wherein $Pd$=compressor discharge pressure; and $Ps$=compressor intake pressure), and 2. The temperature difference (at the reboiler) between the saturation condensation temperature ($Tdb$) of the vapor at the compressor discharge and the boiling point ($Tbb$) of the liquid at the lower par of concentrating section as the bottom liquid of the heat pump distilling column: $Tdb - Tbb \leq 30°$ C.

BRIEF DESCRIPTION OF THE DRAWINGS

In FIGS. 1, 2 and 3, numeral 1 identifies a supply of a mother liquor, numerals 3 and 22 identify column tops, numeral 5 identifies a vapor compressor, numerals 9, 11 and 18 identify conduits, numerals 12 and 28 identify reboilers, and numeral 15 identifies an evaporator.

DETAILED DESCRIPTION OF THE INVENTION

Figure 1:
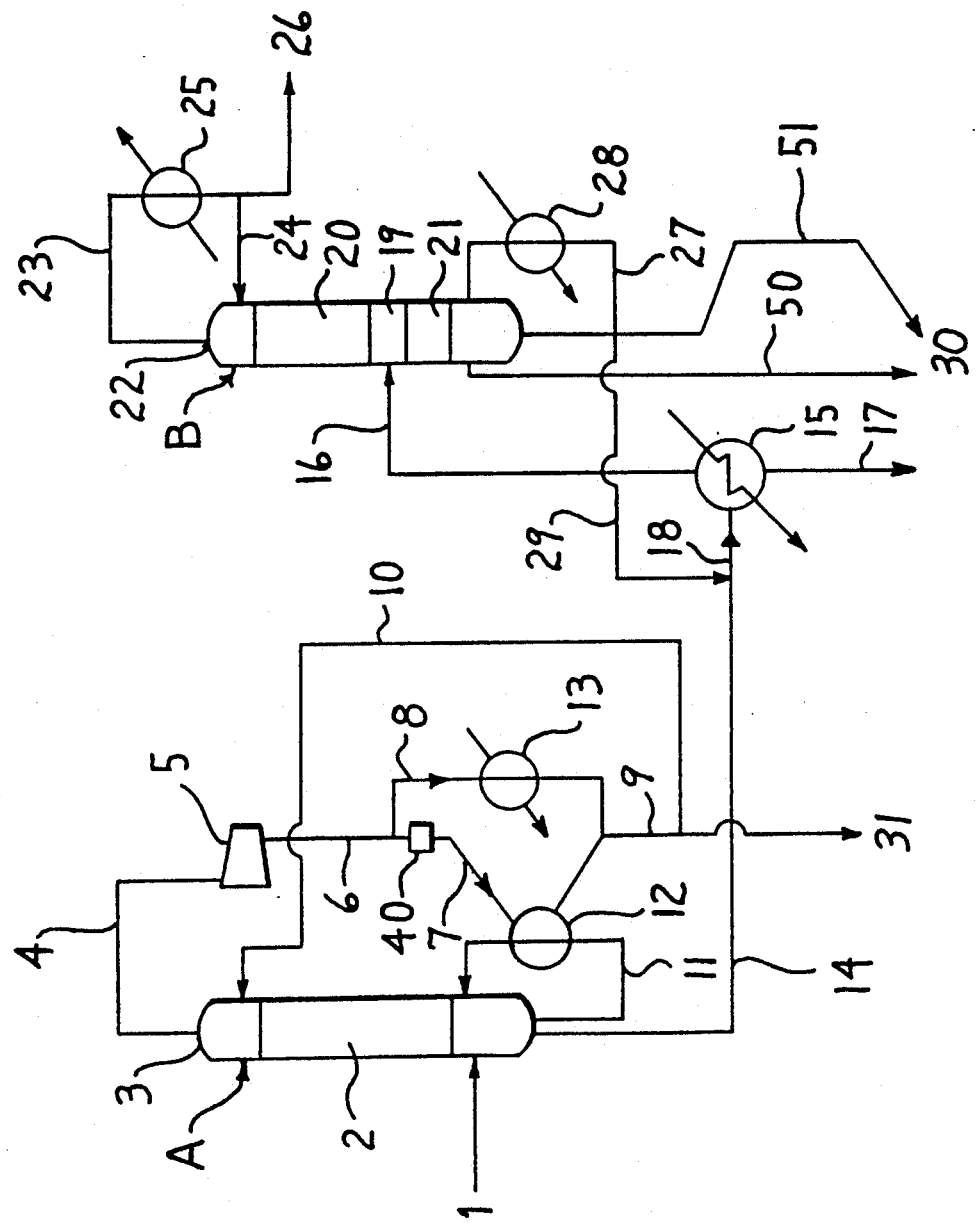
FIG. 1 is a diagram showing a typical example of a recovery flow according to the present invention.

The reasons for the limitations according to the above-described operation conditions are as follows:

(i) The smaller the compression ratio (Pd/Ps) of the compressor 5, the smaller is the amount of power (work energy) that must be supplied to operate the compressor, that is, the input (work) energy is reduced. If this ratio is too small, however, the temperature difference (Tdb−Tbb) in the reboiler 12 becomes excessively small, so that the heat transfer area of the reboiler must be increased and the cost of the reboiler will be increased as well.

(ii) To achieve the desired purity of the distillates, a minimum reflux ratio and a minimum number of theoretical plates exist, and the reflux ratio and the number of theoretical plates are synergistic, mutually interrelated functions of the desired purity of the distillates. In other words, there is the relation such that if one of (1) the minimum reflux ratio or (2) the minimum number of theoretical plates, is increased to achieve a predetermined purity of the distillates, the other is decreased.

In connection with the work energy supplied to operate the compressor, on the other hand, both of (1) increase in the number of theoretical plates and (2) an increase in the reflux ratio, lead to an increase in the work energy. This means that there is a minimum work energy value in order to achieve a predetermined distillate purity.

From the aspect of economy of conventional distilling column equipment, there is a method which sets a reflux ratio at from 1.1 to 1.5 times the minimum reflux ratio. However, an increase in the reflux ratio leads to an increase in the quantity of the fluid that passes through the compressor 5 and, thus, results in an increase in the power required to operate the compressor. Accordingly, in order to limit the power required to operate the compressor, it is necessary to minimize the reflux ratio as much as possible. From the relation of the synergistic functions described above, however, the reduction of the reflux ratio means an increase in the number of theoretical plates. An increase in the number of theoretical plates leads to an increase in the number of stages or the height of the packing inside the column and results in an increased pressure drop inside the column. Accordingly, the pressure difference between the column top and the column bottom becomes greater and results in an increase of the compression ratio (Pd/Ps) of the compressor, described in paragraph (i). Therefore, to limit the power of the compressor while economically restricting the reboiler heat transfer area described in paragraph (i), the discharge pressure of the compressor is set to a pressure at which the discharged vapor has a saturation condensation temperature (Tdb) which is from 3° to 20° C. higher than the boiling point (Tbb) of the column bottom liquid.

For the reasons described in paragraphs (i) and (ii), the compression ratio of the compressor 5 and the temperature difference between the saturation condensation temperature (Tdb) of the vapor at the compressor discharge and the boiling point (Tbb) of the liquid at the lower part of the condensation section are limited as described above. Particularly, the compression ratio is preferably set to be within the range of 1.1 to 3.0 and the operation condition is preferably selected so that Tdb−Tbb is from 3° to 20° C.

However, if there is a maximum limit to the heating temperature, because of the temperature characteristics, such as the decomposition temperature of the volatile solvent, the volatile solute or the non-volatile solids or liquids, the operation pressure of the column must be selected so that the temperature is below this maximum temperature.

DESCRIPTION OF PREFERRED EMBODIMENT

Hereinafter, a solvent recovery method by a heat pump system according to the present invention will be explained with reference to the accompanying drawings.

Figure 2:
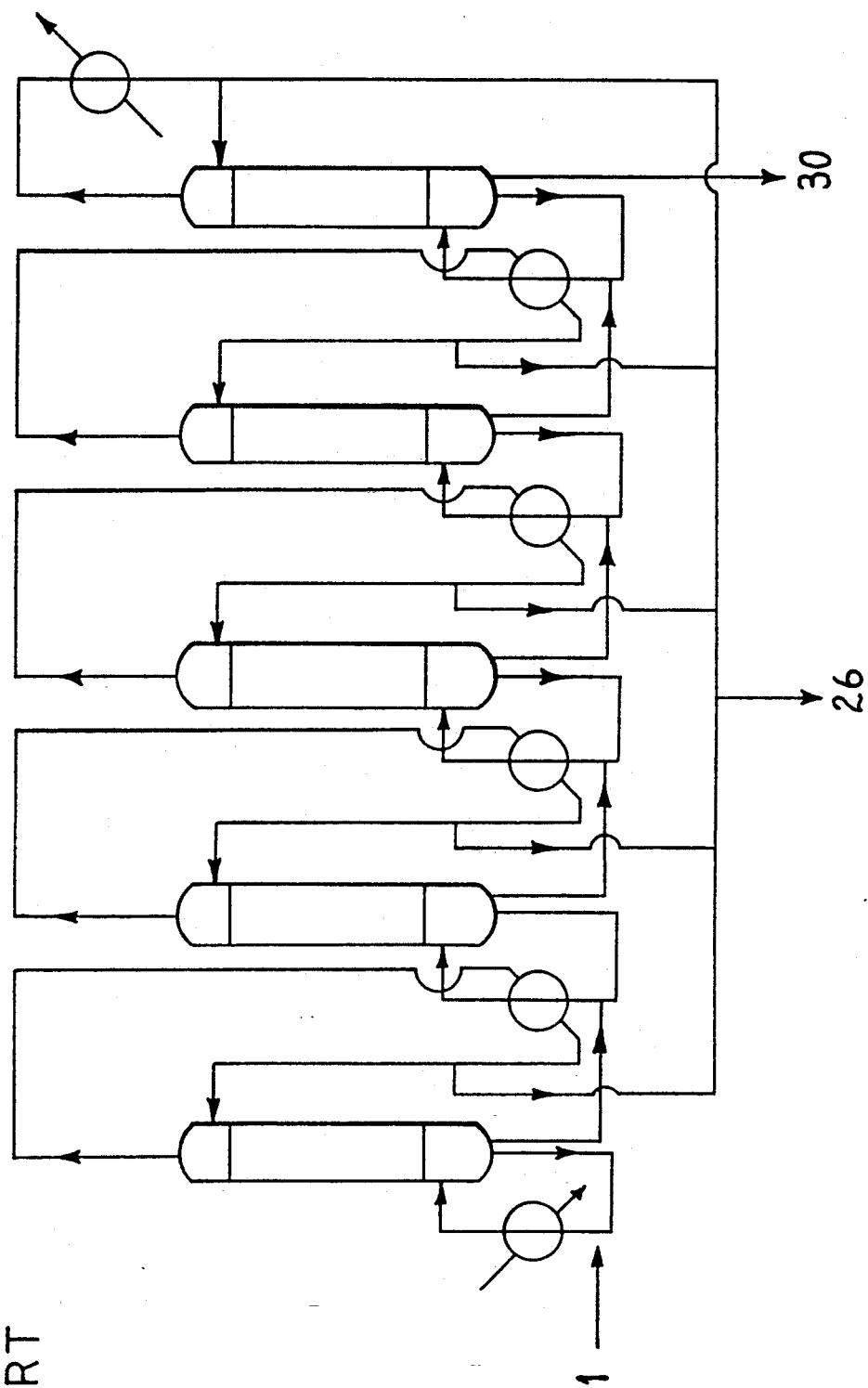
FIG. 2 is a diagram showing a 5-column type flow as a typical example of a recovery flow according to the conventional multiple effect column.

FIG. 2 shows a 5-column type flow as a typical example of the recovery flow by a multiple effect evaporation technique of the prior art. A fractionating section is disposed at the upper part of each effect column. The operation pressure of each effect column is reduced gradually toward the downstream side. When the distillate is constant, the evaporation quantity of each effect column is substantially equal. When the number of columns of the multiple effect column is n, the necessary quantity of externally supplied heat medium, such as steam, is 1/n of that for a single column. The bottoms are a mixture containing non-volatile matters and volatile solvent. Therefore, to separate and purify further the volatile solvent, an apparatus for the separation and purification must be provided separately.

FIG. 1 shows a typical example of the recovery flow according to the present invention.

Mother liquor 1 is supplied to the column bottom of a column A (corresponding to the first column). This mother liquor 1 is preferably pre-heated to a temperature near its boiling point. It can be pre-heated through heat-exchange with the distillates 26, 31 or with the bottoms 30. Prior art techniques can be employed for this purpose. The column A has only a portion 2 corresponding to a concentrating (rectifying) section of a distilling column. This section 2 may be either a packed column or a tray column, and a column having a small pressure drop inside it is greatly preferred. The vapor flows through a column top line 4 of the column A and enters a vapor compressor 5, where the temperature and pressure of the vapor are raised. If the heat energy of the vapor discharged from the compressor 5 is excessive, depending on the condition of heating, a part of the vapor can be flowed through a line 8 and a regulating cooler 13. All of the vapor, except that flowed through line 8, is flowed through a discharge line 7 and a reboiler 12. This vapor provides the necessary heat energy to achieve the separation in the column A. In other words, the vapor from the top of column A is thermally coupled to the bottoms reboiler 12. The compressor 5 uses shaft work to elevate the energy of the vapor to a temperature high enough for reboiling purposes. The condensates from the reboiler 12 and the regulating cooler 13 are combined and a portion of the combined condensates is returned to the column A through a reflux line 10. The remainder of the combined condensates is withdrawn as the distillate 31. A portion of the bottom liquid from column A is flowed though line 11 into the reboiler 12 wherein it is vaporized and returned to the column. The remainder of the bottom liquid of the column A passes through a line 14 and is sent to an evaporator 15. The non-volatile matter initially present in the mother liquor 1 is withdrawn, as a liquid, from the evaporator through a line 17. The mixed vapor of the volatile solute and the volatile solvent evaporated in the evaporator 15 is supplied through a line 16 to a feed stage section 19 of a column B (corresponding to the second column).

Examples of evaporators that can be used as the evaporator 15 include a thin film evaporator, a falling film evaporator or a kettle type heat-exchanger. The most suitable evaporator is selected in accordance with the properties of the non-volatile matter. When the non-volatile matter must be withdrawn in a high concentration and, moreover, when it is viscous, for example, it is preferred to use a thin film evaporator. The evaporation conditions are determined in accordance with the concentration of the non-volatile matter and the maximum temperature to which it can be heated safely.

The condition of pressurization of the vapor by the compressor 5 is determined as already described in the paragraph (i). In this case, the compressor can be selected from various known types, such as a turbo compressor, a screw compressor, a reciprocation compressor, and so forth. The discharge temperature of the vapor from the compressor 5 is determined by the type of compressor used, the compression ratio and the intake condition, but the vapor is generally in a superheated state and has a higher heat energy in many cases than the heat energy that is required for heat transfer to the bottoms in the reboiler 12. Accordingly, the regulating cooler 13 is provided, generally on the discharge side of the compressor. A temperature controller 40 can be provided in the superheated vapor line 6 or 7 in order to take into account the heat transfer area of the reboiler 12 and the maximum temperature to which the bottoms are heated in the reboiler 12.

The column B is a conventional distilling column having a concentrating (rectifying) section 20 and a recovery (stripping) section 21. The column top vapor enters a condenser 25 via a line 23. After the vapor is condensed, a part of it is returned to the column B via a reflux line 24 while the remainder is withdrawn from the column B as the distillate 26. The distillates 26 and 31 can be either mixed or withdrawn individually, depending on the product specification for the distillates. A portion of the column bottom liquid from column B is flowed through line 27 to a reboiler 28. The reboiler 28 of the column B provides the necessary thermal energy to the column bottom liquid to effect the separation in the column B. The thermal energy is supplied to reboiler 28 from an externally supplied heating medium. A line 29 can be provided for returning another portion of the column bottom liquid to the evaporator 15 because a trace amount of the non-volatile matter from the evaporator 15 may be mixed with the vapor fed into the column B, due to entrainment. The remainder of the bottoms are withdrawn as vapor from a line 50 or as a liquid from a line 51.

Figure 3:
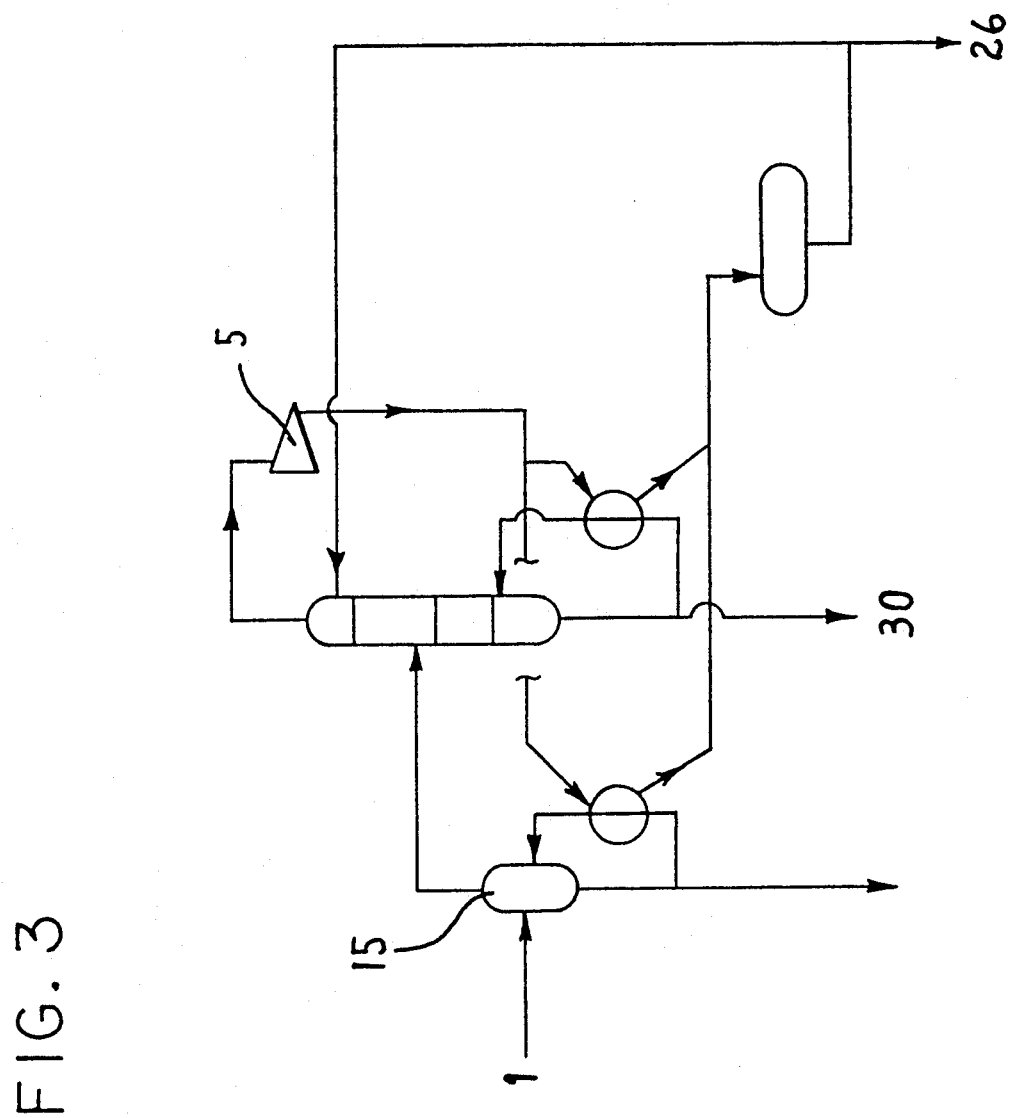
FIG. 3 is a diagram showing an example where the conventional vapor re-compression system distillation method is applied to the solvent recovery method, for comparison with the present invention.

As an example of the application of the conventional vapor recompression type distillation method to the solvent recovery method, which is the object of the present invention, as shown in FIG. 3, it may be possible to place an evaporator in the mother liquor feed conduit for the first column, to supply the heat energy for this evaporator by the heat pump system and to separate beforehand the non-volatile matters. However, this system is not preferable for the following reasons. First, evaporation and separation of large quantities of components of the mother liquor are necessary and, hence, the size of the evaporator installation becomes large. Next, both the concentrating section and the recovery section are provided in the distilling column equipped with the heat pump, so that the pressure drop increases and the boiling point of the bottoms rises unavoidably. If any maximum temperature limit exists for the solute, flexibility of operation is lost. Moreover, since the pressure on the discharge side of the compressor increases, the power must be increased. Furthermore, the distillation effect of the recovery section of the distilling column equipped with the heat pump is limited because a considerable portion of the heat source capacity of the discharged vapor of the compressor must be distributed to the evaporator.

As can be understood clearly from the explanation given above, the solvent recovery method by the heat pump system according to the present invention provides the following remarkable effects:

(1) The portion ranging from the column top of the heat pump distilling column A to the reboiler 12 is used as the concentrating section of the distilling column, and the column bottom liquid of the heat pump distilling column is supplied to the evaporator 15. Since this system is employed, contamination and clogging of the packing materials inside the column and the tray can be prevented. Accordingly, rectification and separation of the solution containing the non-volatile liquid or the solid can be carried out efficiently.

(2) The portion ranging from the column top of the heat pump distilling column A to the reboiler 12 is used as the concentrating section of the distilling column, and the vapor from the evaporator 15 can be supplied to a conventional distilling column (including columns that operate under reduced or elevated pressures). Therefore, rectification of the distillates and the bottoms can be achieved easily. The invention can be applied to separating operations having a strict purity specification.

(3) The number of columns can be smaller than in the conventional multiple effect column, the structure of the columns can be much more simplified than in the multiple effect distillation, and the cost of installation can be reduced, too.

(4) The quantity of the necessary externally supplied heat energy, for example, steam, can be reduced drastically and eventually the operation cost can be reduced, too.

EXAMPLES

Hereinafter, an example and a comparative example will be given so as to explain the present invention in more detail.

EXAMPLE 1 AND COMPARATIVE EXAMPLE 1

A comparative test was carried out between (1) a conventional multiple effect column system, as shown in FIG. 2, and (2) the system of the present invention shown in FIG. 1, for a system in which (1) DMAC (N,N-dimethylacetoamide), as the solute, and (2) polymer, as the non-volatile matter, were dissolved as a mixture in a large quantity of water, as a solvent.

| Composition of mother liquor: | |
|---|---|
| H₂O | 94.9 wt % |
| DMAC | 5.0 wt % |
| polymer | 0.1 wt % |

The recovered materials were water, as the distillate, and DMAC, as the bottoms, and each had a purity of more than 99.9 wt %. The polymer was withdrawn as a mixture with DMAC in both of these systems. The operation conditions of each system are tabulated in Table 1.

Comparisons of energy consumption and energy cost were carried out under the operation conditions shown in Table 1. The results are tabulated in Table 2. In order to standardize the energy level of a required quantity, the necessary heat in the distillation operation necessary for bringing the concentration of the DMAC bottoms of the multiple effect column system into conformity with the level of the present system was added in Table 2. The calculation was conducted, based on a feed quantity of 20,000 kg mother liquor per hour.

TABLE 1

| | This system | | Conventional multiple effect column system | | | | |
|---|---|---|---|---|---|---|---|
| | 1st column | 2nd column | 1st column | 2nd column | 3rd column | 4th column | 5th column |
| Column top pressure (kgf/cm²A) | 5.5 | 1.2 | 4.5 | 2.7 | 1.2 | 1.0 | 0.1 |
| column top temperature (°C.) | 155 | 104 | 147 | 129 | 104 | 99 | 45 |
| reflux ratio | 0.7 | 1.0 | 1.1 | 1.0 | 0.9 | 0.9 | 1.0 |
| distillate concentration H₂O (wt %) | 99.9 | 99.9 | 99.9 | 99.9 | 99.9 | 99.9 | 99.9 |
| compressor discharge pressure (kgf/cm²A) | 7.7 | | | | | | |
| bottom concentration DMAC (wt %) | | 99.9 | | | | | 67.0 |

TABLE 2

| | This system | Conventional multiple effect column system |
|---|---|---|
| required energy quantity | | |
| steam (T/H) | 2.4 | 10.4 |
| electricity (KWH/H) | 1,100 | 220 |
| cooling water (m³/H) | 220 | 490 |
| operation cost | 30,300 | 38,050 |

TABLE 2-continued

| | This system | Conventional multiple effect column system |
|---|---|---|
| (yen/hr) | | | energy unit price:
steam: 3,000 yen/ton
electricity: 20 yen/KWH
cooling water: 5 yen/m³

What we claim is:

1. A method of recovering a solute and a solvent from a mixture which contains a volatile solute, a volatile solvent and non-volatile matter, and in which said solute and said non-volatile matter are present in low concentrations, comprising the steps of: feeding a mother liquor to the column bottom of a first distillation column so that said first distillation column operates only as a concentrating section of a distillation column and said non-volatile matters are prevented from coming into contact with said concentrating section, flowing the column top vapor from said first distillation column through a compressor and thence through a reboiler, heating a portion of the column bottom liquid from said first distillation column in said reboiler and then returning said portion to said column bottom of said first distillation column, feeding the remainder of the column bottom liquid of said first distillation column to an evaporator and therein evaporating said solute and said solvent while maintaining said non-volatile matter in a non-vapor condition, separating said non-volatile matter in said evaporator, feeding the vapor from said evaporator to a second distillation column, and withdrawing distillates of said first and second columns and the bottoms of said second distillation column as products, wherein the steps described above are carried out under operation conditions satisfying the following relations:

1. the compression ratio of said for the column top vapor of said first distillation column: Pd/Ps ≦ 10, wherein Pd = compressor discharge pressure, Ps = compressor intake pressure, and
2. the temperature difference between the saturation condensation temperature (Tdb) of the vapor at the compressor discharge and the boiling point (Tbb) of the bottom liquid of said first distillation column: Tdb − Tbb ≦ 30° C.

2. The method of claim 1 where Pd/Ps is from 1.1 to 3.0 and Tdb − Tbb is from 3° to 20° C.

* * * * *

UNITED STATES PATENT AND TRADEMARK OFFICE
CERTIFICATE OF CORRECTION

PATENT NO. : 5,252,187

DATED : October 12, 1993

INVENTOR(S) : Jun OHTSU et al

It is certified that error appears in the above-identified patent and that said Letters Patent is hereby corrected as shown below:

Column 8, line 54; after "said" insert ---compressor---.

Signed and Sealed this

Thirty-first Day of May, 1994

*Attest:*

BRUCE LEHMAN

*Attesting Officer*     *Commissioner of Patents and Trademarks*